United States Patent
Appelt et al.

(10) Patent No.: US 11,188,083 B2
(45) Date of Patent: Nov. 30, 2021

(54) METHOD, DEVICE, AND COMPUTER READABLE STORAGE MEDIUM WITH INSTRUCTIONS FOR MOTION PLANNING FOR A TRANSPORTATION VEHICLE

(71) Applicant: VOLKSWAGEN AG, Wolfsburg (DE)

(72) Inventors: Christian Appelt, Gifhorn (DE); Simon Grossjohann, Wolfsburg (DE); Kai Homeier, Hannover (DE)

(73) Assignee: Volkswagen AG

( * ) Notice: Subject to any disclaimer, the term of this patent is extended or adjusted under 35 U.S.C. 154(b) by 615 days.

(21) Appl. No.: 15/900,996

(22) Filed: Feb. 21, 2018

(65) Prior Publication Data

US 2018/0253102 A1    Sep. 6, 2018

(30) Foreign Application Priority Data

Mar. 2, 2017 (DE) ...................... 10 2017 104 357.8

(51) Int. Cl.
*G05D 1/02* (2020.01)
*B60W 10/18* (2012.01)
(Continued)

(52) U.S. Cl.
CPC ........... *G05D 1/0217* (2013.01); *B60W 10/18* (2013.01); *B60W 10/20* (2013.01);
(Continued)

(58) Field of Classification Search
CPC ........ G05D 2201/0213; G05D 1/0212; G05D 1/0217; G05D 1/02; B60W 2756/10; B60W 2420/42; B60W 2756/52; B60W 2710/18; B60W 2710/20; B60W 10/18; B60W 10/20; B60W 30/025; B60W 2750/00;
(Continued)

(56) References Cited

U.S. PATENT DOCUMENTS 8,275,049 B2 * 9/2012 Hussain ................. H04N 19/43
375/240.26
8,768,558 B2 * 7/2014 Reeve ................... B62D 15/025
701/28
(Continued)

FOREIGN PATENT DOCUMENTS

CN   105549597 A   5/2016
DE   10231556 A1   1/2003
(Continued)

OTHER PUBLICATIONS

McNaughton; Parallel Algorithms for Realtime Motion Planning; The Robotics Institute, Carnegie Mellon University Doctoral Dissertation; Jul. 2011; Pittsburgh, Pennsylvania.

*Primary Examiner* — Anthony R Jimenez
(74) *Attorney, Agent, or Firm* — Barnes & Thornburg LLP (57) ABSTRACT

A method, an apparatus, and a computer-readable storage medium with instructions for motion planning for a transportation vehicle wherein motion candidates are determined based on an action and state gridding. This involves applying at least one measure for optimizing the motion candidates. Final states of motions of the transportation vehicle corresponding to the movement candidates are determined in a discretized state space and a motion for the transportation vehicle is selected.

15 Claims, 4 Drawing Sheets

(51) Int. Cl.
*B60W 10/20* (2006.01)
*B60W 30/02* (2012.01)
*G05B 13/04* (2006.01)

(52) U.S. Cl.
CPC ......... *B60W 30/025* (2013.01); *G05B 13/041* (2013.01); *G05D 1/0212* (2013.01); *B60W 2420/42* (2013.01); *B60W 2420/52* (2013.01); *B60W 2710/18* (2013.01); *B60W 2710/20* (2013.01); *B60W 2756/10* (2020.02); *G05D 2201/0213* (2013.01)

(58) Field of Classification Search
CPC ......... B60W 2750/40; B60W 2550/00; B60W 2550/40; B60W 2550/402; B60W 2550/406; B60W 2550/408; B60W 2050/0075; B60W 2420/00; B60W 10/00; G05B 13/041; G08G 1/00; G08G 1/01; G08G 1/0112; G08G 1/0125; G08G 1/017; G08G 1/04; G08G 1/042; G08G 1/065; G08G 1/164; G08G 1/166; G06Q 10/047; G01S 5/00; G01S 5/0009; G01S 5/0018; G01S 5/00027; G01S 5/0036; G01S 5/0045; G01S 5/0054; G01S 5/0063; G01S 5/02; G01S 5/021; G01S 5/02213; G01S 13/08; G01S 13/42; G01S 13/50; G01S 13/52; G01S 13/58; G01C 21/3602; G01C 21/26; G01C 21/34; G01C 21/36; G01C 21/00; G01C 31/3181; G01C 22/00; G01C 21/005; G01C 21/10; G01C 21/16; G01C 21/20; G01C 21/28; G01C 21/30; G01C 21/32; G01C 21/3415; G01C 21/343; G01C 21/3492; G01C 21/3614; G01C 21/362; G01C 21/3658; G01C 21/3667; G01C 21/367; G01C 21/3691; G01C 21/203; G01C 21/206; G01C 21/22
USPC .................................................. 701/44, 430
See application file for complete search history.

(56) References Cited

U.S. PATENT DOCUMENTS

| | | | |
|---|---|---|---|
| 9,239,959 B1* | 1/2016 | Evans | G01S 17/931 |
| 2004/0030498 A1 | 2/2004 | Knoop et al. | |
| 2008/0021635 A1* | 1/2008 | Lohmiller | G05D 1/0202 |
| | | | 701/533 |
| 2010/0104199 A1* | 4/2010 | Zhang | G08G 1/165 |
| | | | 382/199 |
| 2018/0172450 A1* | 6/2018 | Lalonde | G01C 21/3453 |

FOREIGN PATENT DOCUMENTS

| | | |
|---|---|---|
| DE | 102007013303 A1 | 9/2008 |
| DE | 102012215060 A1 | 2/2014 |
| DE | 102014215244 A1 | 2/2016 |
| DE | 102014215245 A1 | 2/2016 |
| DE | 102015209066 A1 | 11/2016 |
| EP | 2848487 A1 | 3/2015 |

* cited by examiner

METHOD, DEVICE, AND COMPUTER READABLE STORAGE MEDIUM WITH INSTRUCTIONS FOR MOTION PLANNING FOR A TRANSPORTATION VEHICLE

PRIORITY CLAIM

This patent application claims priority to German Patent Application No. 10 2017 104 357.8, filed 2 Mar. 2017, the disclosure of which is incorporated herein by reference in its entirety.

SUMMARY

Illustrative embodiments relate to a method, an apparatus and a computer readable storage medium with instructions for motion planning for a transportation vehicle. Illustrative embodiments also relate to a transportation vehicle, in which the disclosed method or the disclosed apparatus is used.

BRIEF DESCRIPTION OF THE DRAWINGS

Disclosed embodiments are explained in the following description and the appended claims in conjunction with the drawings, in which:

DETAILED DESCRIPTION

Today's transportation vehicles already have a variety of assistance systems that support the driver when driving a transportation vehicle. Increasingly, part-autonomous or autonomous systems are being used, which enable a partially or fully automated driving of the transportation vehicle.

New generations of assistance systems enable an ever greater selection of automatically executable driving maneuvers and an increasing complexity of these maneuvers. The assisted driving maneuvers typically relate to specific driving tasks, for example, driving, parking or avoiding obstacles.

Against this background, document DE 10 2012 215 060 A1 describes a method for guiding a transportation vehicle. On the basis of at least one sensor, at least one parameter of the environment around the transportation vehicle is detected. On the basis of the parameter a driving corridor and a desired point in the driving corridor are then determined. Finally, depending on at least one other parameter, a trajectory comprising the desired point inside the driving corridor is determined and the guidance of the transportation vehicle is adjusted depending on the determined trajectory.

Document DE 10 2014 215 244 A1 discloses a method for determining a target trajectory for the control and/or regulation of the transverse/longitudinal guidance of a transportation vehicle. On the basis of environment data, one or more objects are detected in an environment of the transportation vehicle. By a global planning process, depending on the detected objects a plurality of potential driving maneuvers is identified, from which a driving maneuver is selected. By a local planning process, a target trajectory for the longitudinal and/or transverse guidance of the transportation vehicle is determined for the selected driving maneuver.

Document DE 10 2014 215 245 A1 describes a method for determining a motion path of a movable object, which comprises a basic object and a kinematically relevant supplement to the basic object. A motion of the basic object is described by a plurality of basic state variables and a motion of the supplement is described by a supplementary state variable. For the basic object a plurality of basic maneuvers is determined, each basic maneuver comprising a history of the plurality of basic state variables from a starting point to an end point of the basic maneuver. The plurality of basic maneuvers is determined in such a way that the plurality of basic state variables assume predefined values at the starting point and end point. In addition, the plurality of basic maneuvers is modified, to determine a plurality of modified basic maneuvers, so that the values of the plurality of basic state variables at the starting point and at the end point of the plurality of basic maneuvers remain unchanged, so that the supplementary state variable assumes predefined values at the starting point and at the end point of the plurality of modified basic maneuvers. By chaining modified basic maneuvers together, a motion path is ultimately determined.

EP 2 848 487 A1 discloses a method for the generation of maneuvers for the automated driving of a transportation vehicle on a one-way street. At fixed time intervals, a collision-free reference trajectory for the longitudinal and transverse movement of the transportation vehicle is determined, which enables a desired speed to be maintained on a preferred traffic lane. For the determination of the reference trajectory a model-predictive control and a quadratic program formulation are used. A control scheme is used, which exploits the structured environment of the one-way street to formulate the conditions for the collision avoidance in a linear way. The generation of a maneuver is achieved by solving the quadratic program.

The paper by McNaughton: "Parallel Algorithms for real-time motion planning" describes an approach to real-time motion planning for a transportation vehicle, which is based on the use of parallel algorithms on a GPU (GPU: Graphics Processing Unit, graphics processor). The approach uses a five-dimensional search space that includes both spatial and temporal dimensions and takes into account the kinematic and dynamic constraints of a typical transportation vehicle. The parallel implementation on a GPU ensures that a dense gridding can be created in the action space.

A universal motion planning requires a complex high-dimensional search space of states of the transportation vehicle, for example, position, speed and acceleration. Potentially global-optimal optimization techniques for calculating trajectories of a transportation vehicle in multiple dimensions suffer from the curse of dimensionality. Since the motion problem of a transportation vehicle is already two-dimensional and, moreover, a state space is described which also has at least two dimensions, this casts doubt on the real-time capability of such an approach. Known approaches to reducing the computational complexity make simplifications in the optimization problem, which are usually obtained at the expense of the optimality or overall applicability of the solution. The use of a reference path, for example, is a simplification, but one which is made at the expense of the usability of the planning technique for a parking operation.

Disclosed embodiments specify solutions for the motion planning for a transportation vehicle, in which a real-time capability is achieved.

This is achieved by the disclosed method, by the disclosed computer-readable storage medium with instructions, and by the disclosed apparatus.

According to a first disclosed embodiment, a method for motion planning for a transportation vehicle comprises:

determining motion candidates based on an action and state gridding, wherein when determining motion candidates at least one measure for optimizing the motion candidates is applied;

determining final states of motions of the transportation vehicle in accordance with the motion candidates in a discretized state space starting from an initial state; and selecting a motion for the transportation vehicle on the basis of the final states.

According to a further disclosed embodiment, a computer readable storage medium contains instructions, which when executed by a computer cause the computer to execute the following operations for motion planning for a transportation vehicle:

determining motion candidates based on an action and state gridding, wherein when determining motion candidates at least one measure for optimizing the motion candidates is applied;

determining final states of motions of the transportation vehicle in accordance with the motion candidates in a discretized state space starting from an initial state; and selecting a motion for the transportation vehicle on the basis of the final states.

The term computer as used here is to be interpreted broadly. It also comprises control units and other processor-based data processing devices.

According to a further disclosed embodiment, an apparatus for motion planning for a transportation vehicle comprises:

a gridding unit for determining motion candidates based on an action and state gridding, wherein the gridding unit is configured to apply at least one measure for optimizing the motion candidates in the determination of motion candidates;

a simulation unit for determining final states of motions of the transportation vehicle in accordance with the motion candidates in a discretized state space starting from an initial state; and a selection unit for selecting a motion for the transportation vehicle on the basis of the final states.

In the solution, a reduction in the computational complexity is achieved by taking measures already at the stage of determining the motion candidates by which the number of candidates to be examined is reduced or by which movement candidates with good prospects of success may be selected. The use of the measures that are described in more detail below leads to considerable savings in the necessary computing time, which either enables a real-time enabled series deployment in the first place, or lowers the costs of the required computing unit due to a lower computing power being required.

In accordance with at least one disclosed embodiment, when determining motion candidates a two-dimensional action space for two control variables is gridded in such a way that motion candidates close to a reference value of the complementary control variable may be selected. A first axis of the two-dimensional action space, for example, represents a steering wheel angle, a curvature or a transverse acceleration, and a second axis of the two-dimensional action space represents a longitudinal acceleration. Reference values would then be, for example, a constant acceleration or a reference steering wheel angle. An illustrative model for a decomposition of the potential total force on the wheel into longitudinal and transverse forces is the Kamm circle. If maximum transverse forces are required, no longitudinal force can be built up due to the tire/road traction, and vice versa. Because of this relationship, the possible actions are already reduced to a quasi-circular surface. However, scanning through these actions for comfort-oriented driving is very time-consuming. By favoring motion candidates close to the axis, the region to be gridded can be further constrained, resulting in a significant reduction of the actions to be calculated. As a result, longitudinal and transverse accelerations are largely executed separately, i.e., the transportation vehicle will only accelerate/brake very slightly during turning maneuvers, or only steer very cautiously during acceleration or braking maneuvers.

In accordance with at least one disclosed embodiment, the motion candidates close to the reference value of the complementary control variable may only be chosen above a threshold value. This helps to ensure that the steering and acceleration can take place at the same time in the lower range of the total forces. In this way it is ensured, for example, that during an overtaking maneuver the transportation vehicle can be accelerated at the same time as changing lanes, which simulates the driving behavior of a human driver.

In accordance with at least one disclosed embodiment, when determining motion candidates a non-linear gridding of the action space or the state space can be performed, in which certain regions of the action space or the state space are gridded with higher resolution than other regions. For example, for the non-linear gridding of the action space or the state space, one action or state axis can be resolved as a quadratic or cubic function. By using such a non-uniform distribution of the movement candidates, a heuristic prioritization of certain state ranges is possible. This means that motion candidates can be selected which are either potentially more promising or which support a comfort-oriented driving style.

In accordance with at least one disclosed embodiment, for a cornering maneuver steering angles with values in the region of the curvature of the bend are more finely gridded than steering angles with values more distant from the curvature of the bend. In this way, smooth steering movements may be chosen which have a positive effect on the driving comfort.

In accordance with at least one disclosed embodiment, accelerations close to zero will be more finely gridded than accelerations with larger values. A finer resolution close to the zero acceleration normally leads to a smooth transition into a driving mode at constant speed.

In accordance with at least one disclosed embodiment, when determining motion candidates, based on a pre-calculated action discretization it is checked whether, and in the event of success how, a desired final pose of the transportation vehicle is reached from each initial state. This is useful during parking maneuvers, to meet the associated accuracy requirements. By generating a pre-calculated action discretization with fine resolution, it is possible to check whether, and in the event of success how, a final pose is reached from any initial state. In contrast to the alternative approach requiring a sufficiently fine global discretization, the test for reaching a solution requires less computational effort. The pre-calculation can be created offline and deployed with a manageable storage overhead. As a result, in the parking scenario a gridding with a much coarser resolution is sufficient.

In accordance with at least one disclosed embodiment, when determining motion candidates additional motion candidates determined according to heuristic rules are fed in, to more closely simulate the attainment of a desired target pose. Using the heuristic approach means that the optimization can be supported for parking maneuvers. For example, for the target approximation it can be checked whether the desired target pose will be reached with the current steering angle, or how far away from it the motion candidate actually is. If necessary, a correction maneuver can then be determined, with which the candidate comes closer to reaching the target.

In accordance with at least one disclosed embodiment, the method is implemented on a GPU, i.e., for the implementation of the method a GPGPU approach (GPGPU: General Purpose computation on Graphics Processing Unit) is followed. The described method provides for a parallel evaluation of the various motion candidates to be performed. Such a parallel evaluation can be optimally implemented on a graphics processor, allowing the required computing time to be significantly reduced.

A disclosed method or a disclosed apparatus may be used in an autonomous or semi-autonomous transportation vehicle, in particular a motor vehicle.

For a better understanding of the principles of the present disclosure, embodiments are described in more detail below by reference to the figures. It goes without saying that the disclosure is not limited to these embodiments and that the described features can also be combined or modified without departing from the scope of protection of the disclosure, as it is defined in the appended claims.

Figure 1:
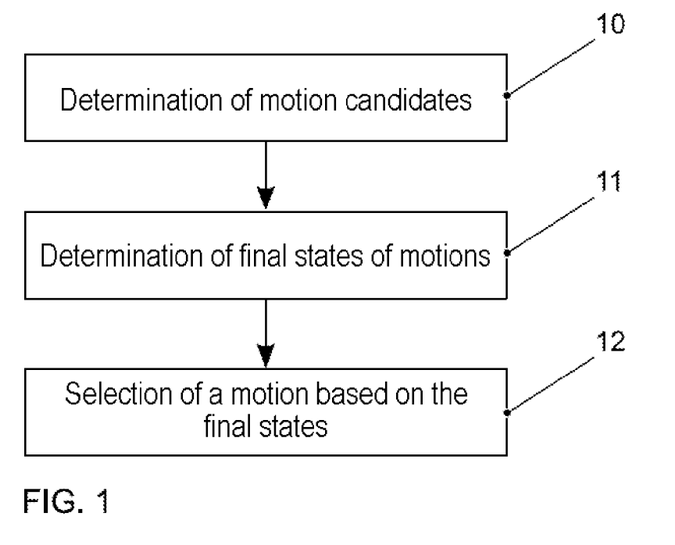
FIG. 1 is a schematic representation of a method for motion planning for a transportation vehicle.

FIG. 1 shows a schematic representation of a method for motion planning for a transportation vehicle. The method may be implemented on a GPU. In a first operation, motion candidates are determined 10 based on an action and state gridding. This involves at least one measure being applied for optimizing the motion candidates. For example, in the determination 10 of motion candidates a two-dimensional action space for two control variables is gridded in such a way that motion candidates close to a reference value of the complementary control variable may be selected. Likewise, a non-linear gridding of the action space or the state space can be performed, in which certain regions of the action space or the state space are gridded with higher resolution than other regions. A further measure consists of checking, on the basis of a pre-calculated action discretization, whether, and in the event of success how, a desired final pose of the transportation vehicle will be reached from each initial state. It is also possible when determining motion candidates to feed in additional motion candidates determined according to heuristic rules, to get closer to the attainment of a desired target pose. Starting from an initial state, final states of motions of the transportation vehicle corresponding to the movement candidates are determined 11 in a discretized state space. On the basis of the final states, a motion for the transportation vehicle is finally selected 12.

Figure 2:
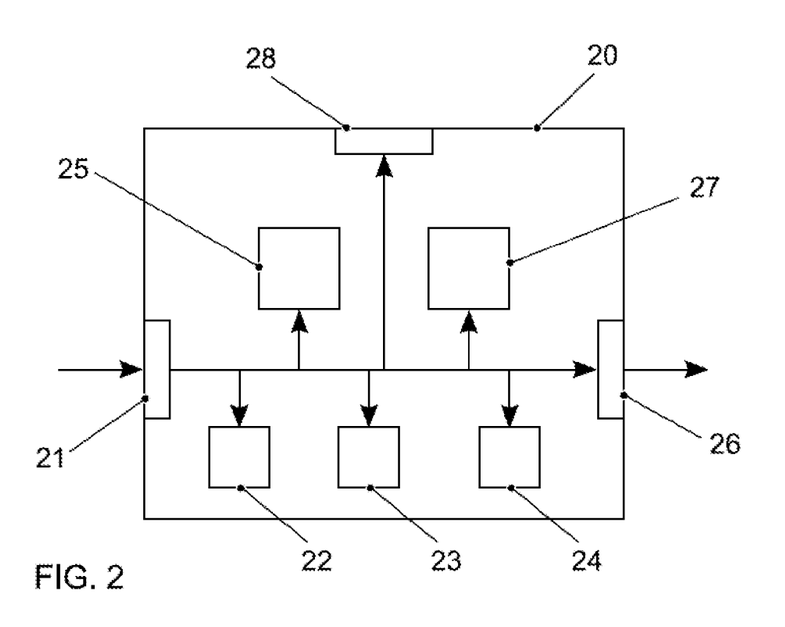
FIG. 2 shows a first embodiment of an apparatus for motion planning for a transportation vehicle.

FIG. 2 shows a simplified schematic representation of a first disclosed embodiment of an apparatus 20 for motion planning for a transportation vehicle. The apparatus 20 has an input 21 for receiving data, which allow a motion planning. Based on an action and state lattice, a gridding unit 22 determines motion candidates. In doing so the gridding unit 22 applies at least one measure for optimizing the motion candidates. For example, in the determination of motion candidates the gridding unit 22 can grid a two-dimensional action space for two control variables, in such a way that motion candidates close to a reference value of the complementary control variable may be selected. Likewise, the gridding unit 22 can perform a non-linear gridding of the action space or the state space, in which certain regions of the action space or the state space are gridded with higher resolution than other regions. A further measure consists of the gridding unit 22 checking, on the basis of a pre-calculated action discretization, whether a desired final pose of the transportation vehicle will be reached from each initial state, and in the event of success, how. It is also possible that when determining motion candidates, the gridding unit 22 feeds in additional motion candidates determined according to heuristic rules, to get closer to the attainment of a desired target pose. Starting from an initial state, a simulation unit 23 determines final states of motions of the transportation vehicle corresponding to the motion candidates in a discretized state space. On the basis of the n final states, a selection unit 24 selects a motion for the transportation vehicle. The data generated by the selection unit 24 are provided via an output 26 of the apparatus 20 for controlling the transportation vehicle. The gridding unit 22, the simulation unit 23 and the selection unit 24 can be controlled by a control unit 25. Via a user interface 28, settings of the gridding unit 22, the simulation unit 23, the selection unit 24 or the control unit 25 can be changed as appropriate. The data produced in the apparatus 20 can also be stored in a memory 27 of the apparatus 20, for example, for later analysis or for use by the components of the apparatus 20. The gridding unit 22, the simulation unit 23, the selection unit 24 and the control unit 25 can be implemented as dedicated hardware, for example, as integrated circuits. But of course, they can also be partially or completely combined, or implemented as software running on a suitable processor, for example, on a GPU. The input 21 and the output 26 can be implemented as separate interfaces or as a combined bi-directional interface.

Figure 3:
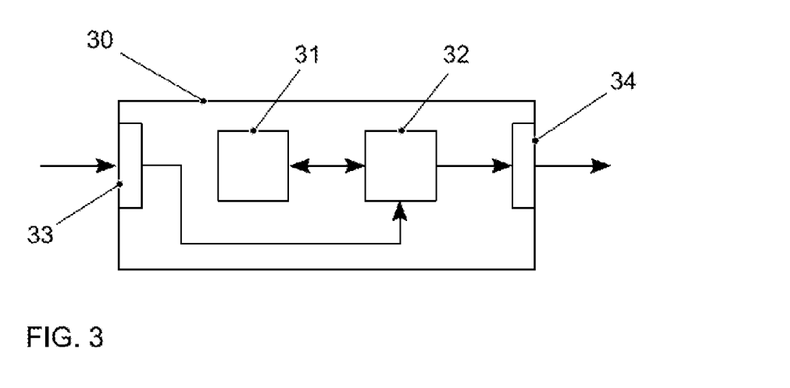
FIG. 3 shows a second embodiment of an apparatus for motion planning for a transportation vehicle.

FIG. 3 shows a simplified schematic representation of a second disclosed embodiment of an apparatus 30 for motion planning for a transportation vehicle. The apparatus 30 comprises a processor 32 and a memory 31. For example, the apparatus 30 is a computer or a control unit. Instructions are stored in the memory 31, which when executed by the processor 32 cause the apparatus 30 to execute the operations according to one of the methods described. The instructions stored in the memory 31 thus embody a program that can be executed by the processor 32, which implements the disclosed method. The apparatus has an input 33 for receiving information. Data generated by the processor 32 are provided via an output 34. In addition, they can be stored in the memory 31. The input 33 and the output 34 can be combined to form a bi-directional interface.

The processor 32 can comprise one or more processor units, for example, microprocessors, digital signal processors, or combinations of these.

The memories 27, 31 of the disclosed embodiments described can have both volatile and non-volatile memory areas and comprise a wide variety of storage devices and storage media, such as hard drives, optical storage media or semiconductor memories.

Figure 4:
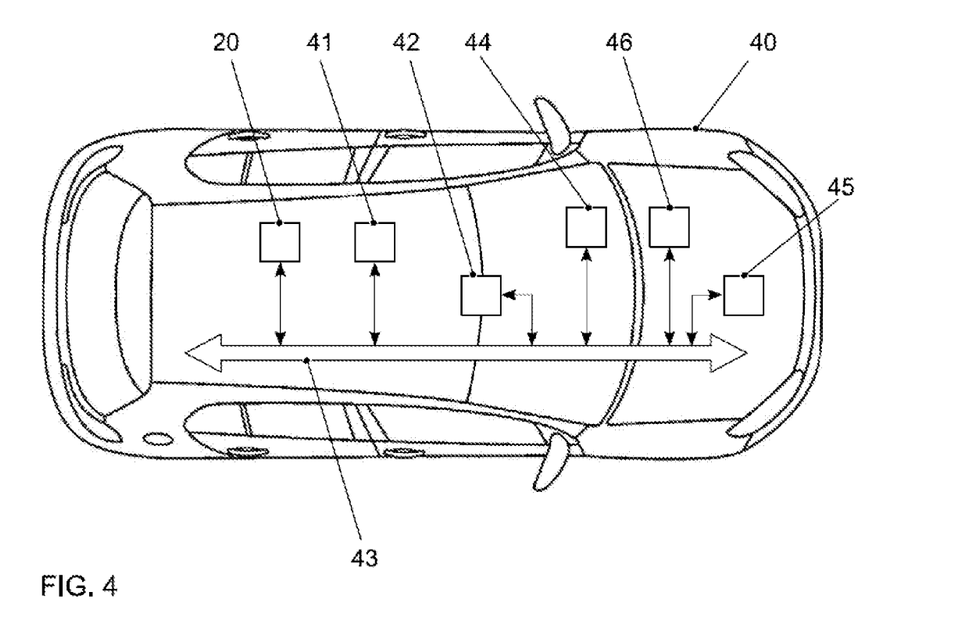
FIG. 4 is a schematic representation of a transportation vehicle, in which a disclosed solution is realized.

FIG. 4 is a schematic representation of a transportation vehicle 40, in which a solution is realized. The transportation vehicle 40 comprises, among other things, a navigation system 41 and an environment sensor device 42, such as a camera or radar system. The data collected by the navigation system 41 and the environment sensor device 42 are transmitted via a network 43 to an apparatus 20 for motion planning. The data generated by the apparatus 20 are transmitted to the appropriate control units in the transportation vehicle 40, for example, to a steering controller 44, a brake controller 45 or a speed controller 46. The data transmission may take place over the network 43.

Figure 5:
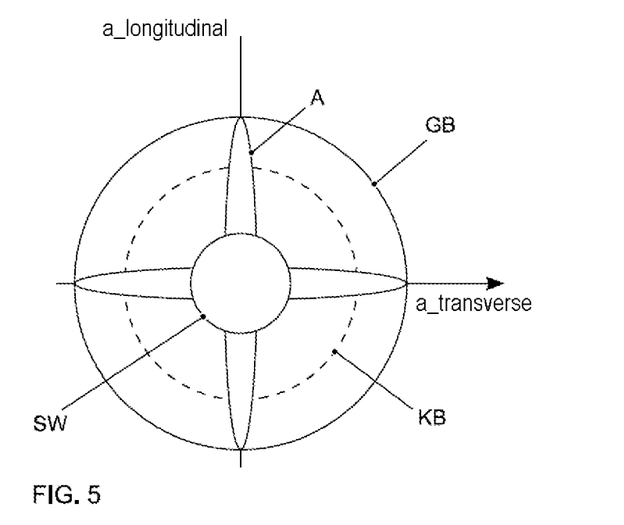
FIG. 5 is a schematic representation of a gridding of a two-dimensional action space for two control variables, in which motion candidates close to a reference value of the complementary control variable are shown.

In the following, an embodiment will be described by reference to FIGS. 5 to 7.

If a model-based motion planning is to cover virtually all driving scenarios, in principle, all control variables for longitudinal and transverse actions in a range from minimum to maximum longitudinal and transverse forces must be calculated. An illustrative model for a decomposition of the potential total force on the wheel into longitudinal and transverse forces is the Kamm circle. If maximum transverse forces are required, no longitudinal force can be built up due to the tire/road traction, and vice versa. In spite of the already resulting reduction in the possible actions to a quasi-circular surface, scanning of these actions for a comfort-oriented driving style is very time-consuming. In accordance with the disclosure, therefore, the possible longitudinal and transverse actions are further restricted, so that virtually isolated longitudinal and transverse behaviors are obtained. This is shown schematically in FIG. 5 as a Kamm circle. The axes of the Kamm circle in this example are defined by the longitudinal acceleration a_longitudinal and lateral acceleration a_transverse. Within a limit region GB a comfort range KB is defined, in which the actions for comfort-oriented driving should lie. In addition, a "cross-like" gridding of the action space takes place, i.e., motion candidates or actions close to a reference value of the complementary control variable may be chosen. A threshold value SW can be provided, from which motion candidates close to the axis may be chosen.

In addition, the transverse component can be transmitted to the steering wheel angle. An action-gridding motion planner with this model will therefore brake before a bend, then vary the trajectory of the steering wheel angle for the bend while only slightly changing the speed, and significantly accelerate only after exiting the bend. This behavior simulates the typical behavior of a human driver very closely. The threshold value SW ensures that the steering and accelerating can take place simultaneously in the lower range of the total forces. In this way it is guaranteed, e.g., that during an overtaking maneuver the transportation vehicle can be accelerated at the same time as it changes lanes. The reduction of the circle to a much smaller area A of the circular area to be sampled leads to a reduction in the number of actions to be calculated.

Figure 6:
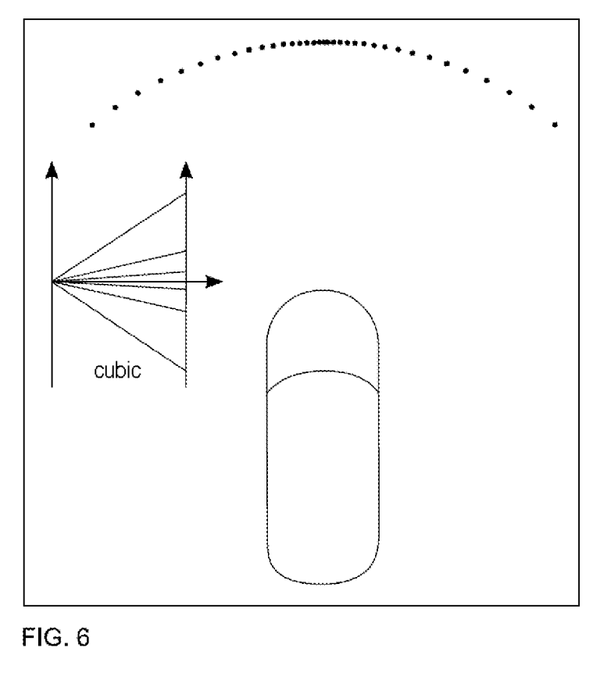
FIG. 6 shows a schematic representation of a non-linear gridding of the action space.
Figure 7:
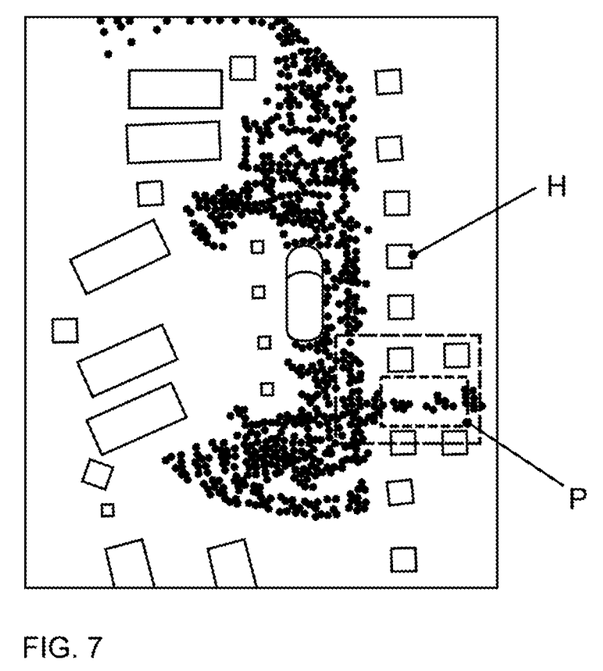
FIG. 7 illustrates the use of a pre-calculated action discretization.

FIG. 6 shows a schematic representation of a non-linear gridding of the action space as a further measure for optimizing the motion candidates. An obvious partitioning of the state and action space is the linear equidistant division of each dimension. This corresponds to a uniformly distributed approach without any previous knowledge. By using a non-uniform distribution on the other hand, a heuristic prioritization of certain state ranges is possible. To represent a curve trajectory, for example, it is advisable to resolve the steering angle state axis as a quadratic or cubic function near to the curvature of the bend and resolve it more coarsely further away from this value. In the figure, a cubic gridding of the steering angle state axis is indicated by the black dots. The action gridding can also be handled in the same way. A finer resolution close to the zero acceleration leads, for example, to a smooth transition into a driving mode with constant speed.

A typical problem of an exploratory optimization approach using a gridding of the actions, in which the optimizer does not know the final states of a motion function in advance, is the lack of precision as to the occupation of a desired state. Reaching a precise target pose (position and angle), for example, when parking, is therefore difficult.

Figure 8:
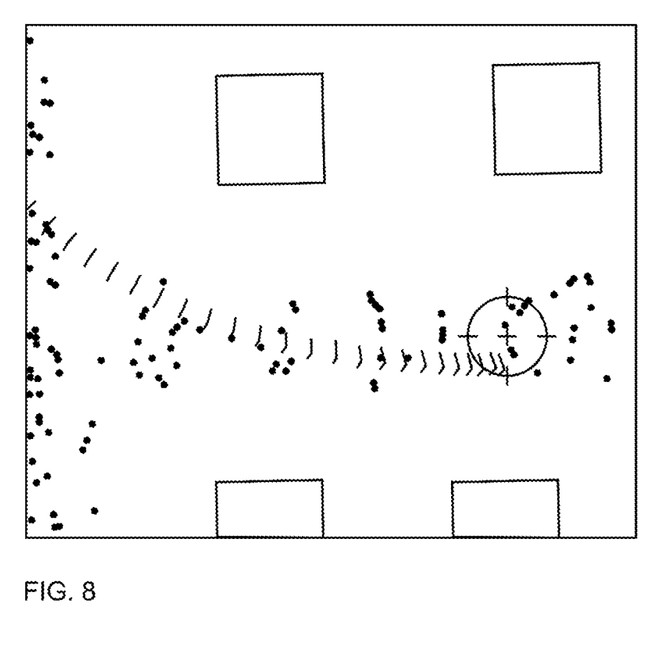
FIG. 8 shows a magnified detail of FIG. 7.

A first possible method of solving this problem is the use of a pre-calculated action discretization. This is illustrated in FIG. 7, in which the motion planning for a parking scenario is shown. A number of obstacles H and an accessibility set are shown. Positions accessible by the motion planning are marked by black dots. As is apparent from the magnified detail of the image, which is shown in FIG. 8, there are relatively few accessible positions within the desired parking area P. This makes it difficult to satisfy the accuracy requirements for a parking maneuver. By generating a finely resolved pre-calculated action discretization however, it is possible to check whether a final pose is accessible from any initial state, and in the event of success, how. In contrast to the alternative approach requiring a sufficiently fine global discretization, the test for reaching a solution requires less computational effort. The pre-calculation can be generated offline and provided with a manageable storage overhead. As a result, in the parking scenario a much more coarse-resolution gridding is sufficient.

A second way to solve the problem is to generate heuristic target approximation candidates. The underlying motion planning approach allows additional candidates to be fed in, in addition to the trivial gridding of longitudinal and transverse actions. Here, heuristic rules can be used to more closely approximate the target pose or its attainment. Similarly to the combination of global optimality and the use of heuristics in the A* algorithm for route finding, the heuristic complements the optimization. In the worst case all heuristics are unusable and the algorithm falls back on the underlying Dykstra algorithm. For example, for the target approximation it can be checked whether the pose will be reached with the current steering angle, or how far away from it the motion candidate actually is. In the latter case, a correction maneuver can be determined with which the candidate comes closer to reaching the target, for example, by braking/slowing down, or steering in such a way that it drives into the target pose.

LIST OF REFERENCE NUMERALS 10 determination of motion candidates
11 determination of final states of motions
12 selection of a motion on the basis of the final states
20 apparatus
21 input
22 gridding unit
23 simulation unit
24 selection unit
25 control unit
26 output
27 memory
28 user interface
30 apparatus 31 memory
32 processor
33 input
34 output
40 transportation vehicle
41 navigation system
42 environment sensor device
43 network
44 steering control unit
45 brake control unit
46 speed regulation
GB limit region
KB comfort region
SW threshold value
A region to be scanned
H obstacle
P parking area

The invention claimed is:

1. A method for motion planning for a transportation vehicle, the method comprising:
   determining motion candidates based on an action and state gridding, wherein, for reducing a computational complexity, at least one measure is applied for reducing a number of motion candidates that are evaluated within at least one of an action space and a state space;
   determining final states of motions of the transportation vehicle corresponding to the motion candidates in a discretized state space starting from an initial state; and
   selecting a motion for the transportation vehicle based on the determined final states.

2. The method of claim 1, further comprising checking, for each initial state, whether and how a specified final position of the transportation vehicle is reached based on the motion candidates and based on a pre-calculated action discretization.

3. The method of claim 1, wherein, in the determining of the final states, the motion candidates in the discretized state space include heuristic target approximation candidates that are analyzed to attain a specified target pose.

4. The method of claim 1, wherein the method is implemented on a GPU.

5. The method of claim 1, wherein, in the selecting of the motion for the transportation vehicle, a two-dimensional action space for two control variables is gridded based on the number of motion candidates such that the motion for the transportation vehicle is selected from a subset of the number of motion candidates that are proximate to a reference value of a complementary control variable.

6. The method of claim 5, wherein a first axis of the two-dimensional action space indicates a steering wheel angle, a curvature or a transverse acceleration and a second axis of the two-dimensional action space indicates a longitudinal acceleration.

7. The method of claim 5, wherein, in the selecting of the motion for the transportation vehicle, the motion candidates that are proximate to the reference value of the complementary control variable are selected only above a threshold value.

8. The method of claim 1, further comprising performing a non-linear gridding of the at least one of the action space and the state space based on the number of motion candidates, wherein some regions of the at least one of the action space and the state space are gridded with higher resolution than other regions.

9. The method of claim 8, wherein, when the transportation vehicle is driving around a bend having a curvature, steering angles with values corresponding to motions proximate to the curvature of the bend are more finely gridded than steering angles with values corresponding to motions distant from the curvature of the bend.

10. The method of claim 8, wherein accelerations nearer to zero are gridded more finely than accelerations with larger values.

11. The method of claim 8, wherein, for the non-linear gridding of the action space or the state space, an action axis or a state axis is sampled using a quadratic function or a cubic function.

12. A non-transitory computer-readable storage medium with instructions which are executable by a computer and cause the computer to execute a method for motion planning for a transportation vehicle, the method comprising:
   determining motion candidates based on an action and state gridding, wherein, for reducing a computational complexity, at least one measure is applied for reducing a number of motion candidates that are evaluated within at least one of an action space and a state space;
   determining final states of motions of the transportation vehicle corresponding to the motion candidates in a discretized state space starting from an initial state; and
   selecting a motion for the transportation vehicle based on the determined final states.

13. The computer-readable storage medium of claim 12, wherein, in the selecting a motion for the transportation vehicle, a two-dimensional action space for two control variables is gridded based on motion candidates such that motion candidates nearer to a reference value of a complementary control variable are selected.

14. An apparatus for motion planning for a transportation vehicle, the apparatus comprising:
   a gridding unit for determining motion candidates based on an action and state grid, wherein, for reducing a computational complexity, the gridding unit is configured to apply at least one measure for reducing a number of motion candidates that are evaluated within at least one of an action space and a state space;
   a simulation unit for determining final states of motions of the transportation vehicle corresponding to the motion candidates in a discretized state space, starting from an initial state; and
   a selection unit for selecting a motion for the transportation vehicle based on the final states.

15. A transportation vehicle comprising an apparatus for motion planning for a transportation vehicle, the apparatus comprising a gridding unit for determining motion candidates based on an action and state grid, wherein, for reducing a computational complexity, the gridding unit is configured to apply at least one measure for reducing a number of motion candidates that are evaluated within at least one of an action space and a state space, a simulation unit for determining final states of motions of the transportation vehicle corresponding to the motion candidates in a discretized state space, starting from an initial state, and a selection unit for selecting a motion for the transportation vehicle based on the final states.

* * * * *